Patented Dec. 18, 1951

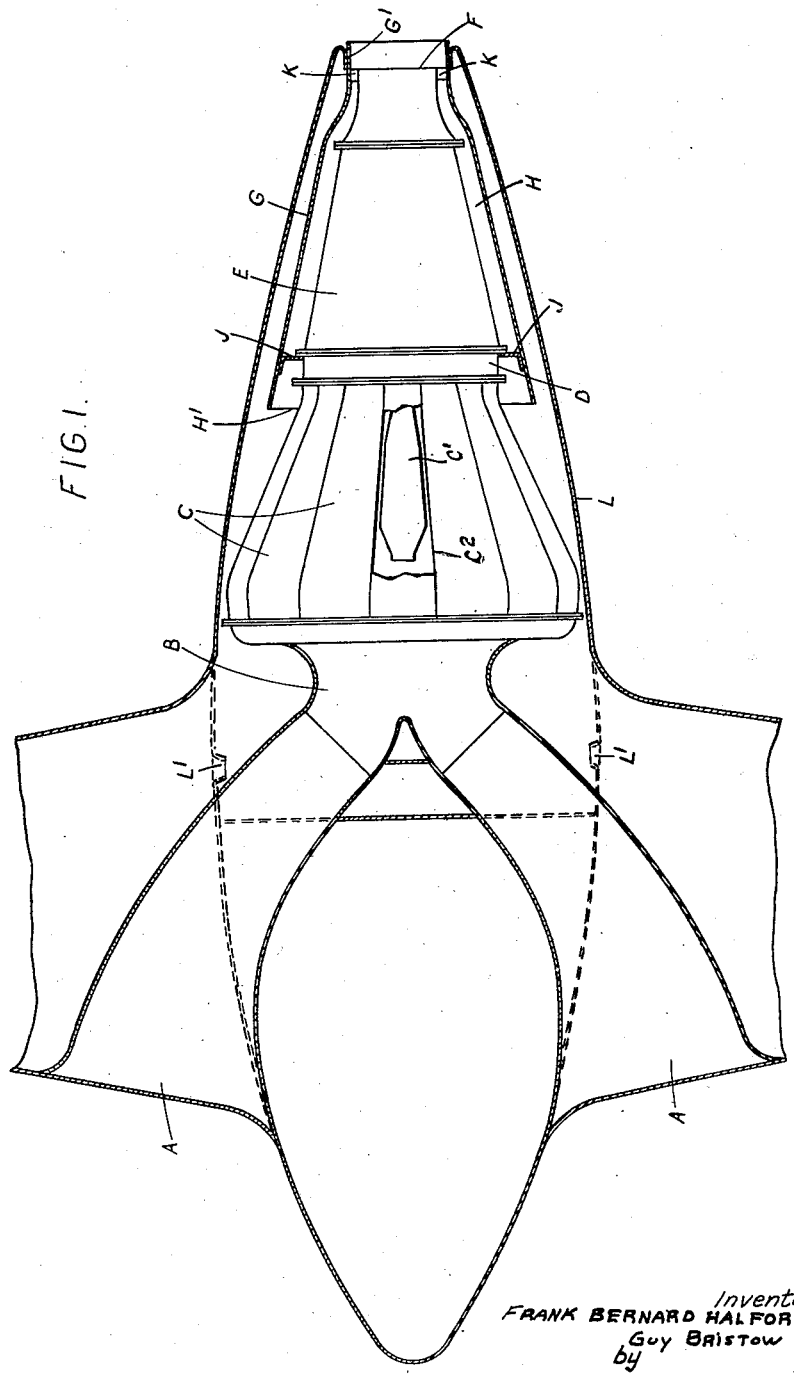

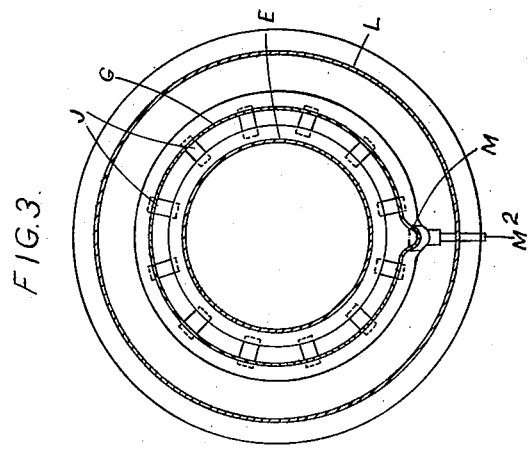
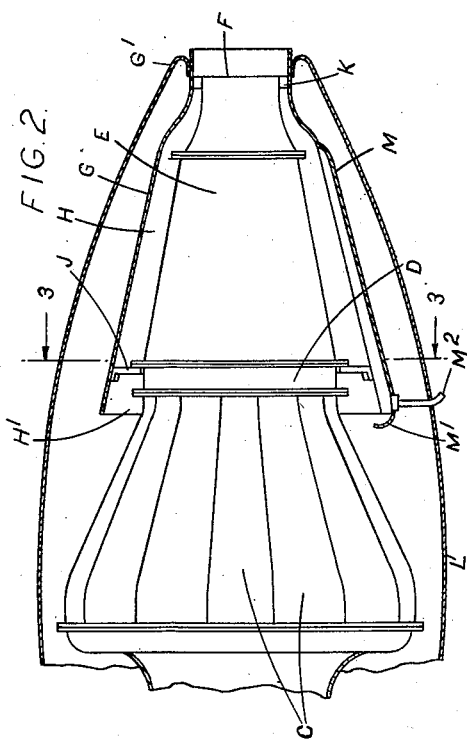

2,579,114

UNITED STATES PATENT OFFICE 2,579,114

COOLING MEANS FOR TAIL PIPES OF JET PROPULSION MOTORS

Frank Bernard Halford, Edgware, and Guy Bristow, Stanmore, England, assignors to The De Havilland Aircraft Company Limited, Hatfield, England, a company of Great Britain Application June 18, 1946, Serial No. 677,492
In Great Britain May 11, 1945

Section 1, Public Law 690, August 8, 1946
Patent expires May 11, 1965

2 Claims. (Cl. 60—35.6)

This invention relates to turbo-compressor jet-propulsion apparatus more especially for use in aircraft and of the type in which a compressor coaxial with and driven by a turbine from which it is spaced apart in the axial direction delivers air into a series of separate tubular combustion chambers spaced apart circumferentially in an annular formation around the turbine shaft and between the compressor and the turbine to which the combustion products flow and cause its rotation before these gases issue with propulsive effect from a central nozzle which is coaxial with the turbine shaft. A single annular combustion chamber may be used in place of the multiple chambers. The object of the invention is to avoid the use of lagging as commonly employed around the casing enclosing the turbine and the passageway between the turbine and the nozzle. It is usually considered desirable to place some form of lagging over these parts of the apparatus which tend to attain a high temperature. This lagging serves to reduce heat losses and minimise the risk of fire and damage to parts adjacent to the apparatus. A common practice is to encase the parts in a blanket or layer of asbestos or like heat-insulating substance, or to dispose in the same way a metal foil formation which provides a large number of small air pockets which give the desired heat insulation. In each case, however, under certain circumstances fuel may drain into this lagging or jacket and being retained in the substance of which the lagging is made may later become vaporised and give rise to risk of fire.

According to this invention the casing enclosing the turbine and the passageway leading therefrom to the nozzle is lagged by air contained in a jacket space formed between this casing and a tubular member or sleeve which surrounds the casing from which it is spaced apart in the radial direction, the rear end of this tubular member or sleeve extending beyond the nozzle whereby the extractor effect of the gases issuing from the nozzle will draw air through the jacket space. The air enters this jacket space through an opening at the forward end thereof and issues through an annular opening around the nozzle.

The tubular sleeve which forms the jacket space keeps relatively cool and the heat taken off by the flow of cooling air is not an entire loss since it is recovered at any rate partially in terms of thrust where this air joins the propulsive jet of combustion products. Any fuel which may happen to collect in this sleeve can readily be drained away to a safe point.

The forward part of the whole apparatus is not liable to get hot enough to require this air jacket lagging especially as the combustion chambers or chamber are themselves individually jacketed for cooling purposes. An outer casing or nacelle for the whole apparatus is provided and this nacelle is conveniently extended rearwards to or near to the nozzle, the rear part of this outer casing surrounding but being spaced apart wholly, or except at its rear end, from the sleeve forming the lagging jacket. In some cases air may flow within the nacelle and between it and the sleeve to an annular outlet around the jet nozzle. The induced flow of air through this jacket lagging may cause air to be drawn into and through the forward part of the nacelle so that good cooling and ventilation is provided for the whole engine compartment even when the aircraft is stationary on the ground and the turbine plant is running. With this apparatus for ensuring air flow it is possible to arrange for the pressure in the engine compartment, that is to say within the above-mentioned outer casing, to be maintained slightly lower than the external atmospheric pressure so that any fumes which may be produced will not tend to leak out and possibly find their way into the pilot's cockpit.

The accompanying drawings illustrate somewhat diagrammatically and by way of example a construction which may be employed in carrying the invention into practice. In these drawings, Figure 1 is a part-sectional plan of a turbo-compressor propulsive apparatus provided with the improved arrangement for effecting the cooling of the passageway or jet pipe between the turbine and the nozzle through which issues the propulsive jet.

Figure 2 is a part-sectional side elevation of the construction shown in Figure 1.

Figure 3 is a transverse section on the line 3—3 in Figure 2 looking in the direction of the arrows.

Referring to the drawings, the type of turbo-compressor propulsive apparatus with which the invention is more especially intended to be used comprises twin intake passages A leading to a casing B enclosing the impeller of the compressor which delivers air into a series of separate tubular combustion chambers C wherein fuel is burnt. The gases from these chambers flow to and act on a turbine disposed within the casing at D and on leaving the turbine the gases pass from the tubular and somewhat conical casing E to issue from the nozzle F with propulsive effect.

Around the casing E is placed a sleeve G which is somewhat conical like the casing E but has a larger diameter so that there is an annular lagging space H between the sleeve and the casing E throughout the length of the latter, the sleeve extending also around the casing D within which is the turbine. Towards its forward end the sleeve G is supported by brackets J which are circumferentially spaced apart as may be seen in Figure 3, while towards its rear end the sleeve is carried by pads K disposed between the sleeve and the nozzle F these pads being also spaced apart around the nozzle. Thus air constituting a lagging can lie and in this case flow freely within the sleeve along the annular space H and over the casings D and E and this air will issue round the nozzle F the airflow being induced by the gas jet issuing from the nozzle. The whole apparatus is enclosed in an outer casing or nacelle L which extends from the air intakes A, around the compressor and combustion chambers C and the sleeve G to the rear end of which this nacelle is attached at $G^1$. Air can freely enter the forward part of the nacelle L through spaced openings $L^1$ therein and this air can then flow over the combustion chambers C and into the space H within the sleeve G through the annular opening $H^1$ at the forward end of the sleeve. The nacelle L is conveniently so formed that it is spaced radially out from the sleeve G. The air flowing within the nacelle to the lagging space H within the sleeve G is not appreciably heated as it passes over the combustion chambers C since in each combustion chamber the combustion takes place within an internal flame tube $C^1$ (seen in the partly sectioned combustion chamber in Figure 1), and relatively cool air drawn from the casing B flows through the annular space between the flame tube $C^1$ and the combustion chamber casing $C^2$.

Since some small quantity of fuel may tend to collect in the sleeve G the latter is formed along its under side with a groove M as may be seen in Figures 2 and 3. At the forward end of this groove is an upturned lip $M^1$ and behind this lip is a drain pipe $M^2$ so that any liquid fuel in the sleeve G will flow by gravity along the groove M and drain away through the pipe $M^2$.

What we claim as our invention and desire to secure by Letters Patent is:

1. Turbo-compressor propulsive apparatus comprising in combination a compressor, a turbine coupled to the compressor, means by which fuel is burnt in the air delivered by the compressor and the resultant gases are led to the turbine and by acting on it drive it and the compressor, a jet propulsion nozzle, a passageway through which the gases from the turbine flow to said nozzle from which these gases issue with propulsive effect, a sleeve surrounding but spaced radially out from said passageway and providing a jacket space containing air which constitutes a lagging for the said passageway, and a drain leading from the lower part of the said jacket space through which will be carried off fuel that may collect within the said jacket sleeve.

2. Turbo-compressor propulsive apparatus comprising in combination a compressor, a turbine coupled to the compressor, means by which fuel is burnt in the air delivered by the compressor and the resultant gases are led to the turbine and by acting on it drive it and the compressor, a jet propulsion nozzle, a passageway through which the gases from the turbine flow to said nozzle from which these gases issue with propulsive effect, and a sleeve surrounding but spaced radially out from said passageway and providing a jacket space containing air which constitutes a lagging for the said passageway, the jacket sleeve having a diameter which is greater at the end adjacent to the said turbine than at the end adjacent to the said nozzle, at least one longitudinal groove in the lower part of the said jacket sleeve and serving as a drain, and a drain pipe leading from the lower end of this groove so that fuel which may collect within the said jacket sleeve will flow down the longitudinal groove and be carried off through the said drain pipe.

FRANK BERNARD HALFORD.
GUY BRISTOW.

REFERENCES CITED

The following references are of record in the file of this patent:

UNITED STATES PATENTS

| Number | Name | Date |
| --- | --- | --- |
| 2,346,178 | Mercier | Apr. 11, 1944 |
| 2,397,816 | Sorensen | Apr. 2, 1946 |
| 2,397,998 | Goddard | Apr. 9, 1946 |
| 2,401,941 | Lee | June 11, 1946 |
| 2,409,177 | Allen et al. | Oct. 15, 1946 |
| 2,426,872 | Willgoos | Sept. 2, 1947 |
| 2,432,359 | Streid | Dec. 9, 1947 |
| 2,445,114 | Halford | July 13, 1948 |